(12) United States Patent
Akaza et al.

(10) Patent No.: US 10,471,884 B2
(45) Date of Patent: Nov. 12, 2019

(54) HEADLIGHT OPTICAL-AXIS CONTROL DEVICE

(71) Applicant: MITSUBISHI ELECTRIC CORPORATION, Tokyo (JP)

(72) Inventors: Mitsuaki Akaza, Tokyo (JP); Toshiyuki Yamashita, Tokyo (JP); Takashi Ohsawa, Tokyo (JP); Wataru Tsujita, Tokyo (JP); Takahiko Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 357 days.

(21) Appl. No.: 15/321,960

(22) PCT Filed: Sep. 16, 2014

(86) PCT No.: PCT/JP2014/074410
§ 371 (c)(1),
(2) Date: Dec. 23, 2016

(87) PCT Pub. No.: WO2016/042599
PCT Pub. Date: Mar. 24, 2016

(65) Prior Publication Data
US 2017/0129390 A1    May 11, 2017

(51) Int. Cl.
*B60Q 1/115* (2006.01)
*F21S 41/657* (2018.01)

(52) U.S. Cl.
CPC ............ *B60Q 1/115* (2013.01); *F21S 41/657* (2018.01); *B60Q 2300/112* (2013.01);
(Continued)

(58) Field of Classification Search
CPC ...... B60Q 1/00; B60Q 1/0029; B60Q 1/0035; B60Q 2300/05; B60Q 2300/12;
(Continued)

(56) References Cited

U.S. PATENT DOCUMENTS 8,380,391 B2 * 2/2013 Baino .................. B62J 6/02
                                              362/37
8,838,343 B2 * 9/2014 Kasaba .................. B60Q 1/10
                                              701/49
(Continued)

FOREIGN PATENT DOCUMENTS

EP    2 724 889 A2    4/2014
EP    2 738 041 A2    6/2014
(Continued)

OTHER PUBLICATIONS

Office Action issued in corresponding German Patent Application No. 11 2014 006 958.2 dated Jun. 14, 2019.

*Primary Examiner* — Anthony R Jimenez
(74) *Attorney, Agent, or Firm* — Birch, Stewart, Kolasch & Birch, LLP

(57) ABSTRACT

In a headlight optical-axis control device 10, a controller 15 is configured to: calculate vehicle angles indicating tilt angles of a vehicle relative to a road surface, on the basis of ratios, each being a ratio of a difference between a reference acceleration in a longitudinal direction and a signal indicating an acceleration in the longitudinal direction detected during traveling of the vehicle, to a difference between a reference acceleration in a perpendicular direction and a signal indicating an acceleration in the perpendicular direction detected during traveling of the vehicle by an acceleration sensor 2; calculate a plot of the calculated vehicle angles thereby to derive a vehicle angle corresponding to a case where a change of the acceleration in the longitudinal direction is zero; and generate a signal for controlling the optical axes of headlights 5L and 5R on the basis of the derived vehicle angle.

7 Claims, 13 Drawing Sheets

(52) U.S. Cl.
CPC .. *B60Q 2300/114* (2013.01); *B60Q 2300/116* (2013.01); *B60Q 2300/132* (2013.01); *B60Q 2300/324* (2013.01)

(58) Field of Classification Search
CPC .................... B60Q 2300/122; B60Q 2300/13; G01C 1/00; G01C 3/00; G01C 5/00; G01C 5/02; G01C 5/04
USPC ......................... 362/460, 464, 465, 467, 45
See application file for complete search history.

(56) References Cited

U.S. PATENT DOCUMENTS

| | | | |
|---|---|---|---|
| 2001/0039469 A1* | 11/2001 | Nishimura | B60Q 1/085 701/49 |
| 2012/0101692 A1 | 4/2012 | Kasaba et al. | |
| 2014/0156150 A1 | 6/2014 | Kasaba et al. | |

FOREIGN PATENT DOCUMENTS

| | | | | |
|---|---|---|---|---|
| EP | 2676839 B1 * | 3/2016 | ........... | B60Q 1/1423 |
| JP | 2012-106719 A | 6/2012 | | |
| JP | 2014-101109 A | 6/2014 | | |
| JP | 2014-104788 A | 6/2014 | | |
| JP | 2014-108639 A | 6/2014 | | |

\* cited by examiner

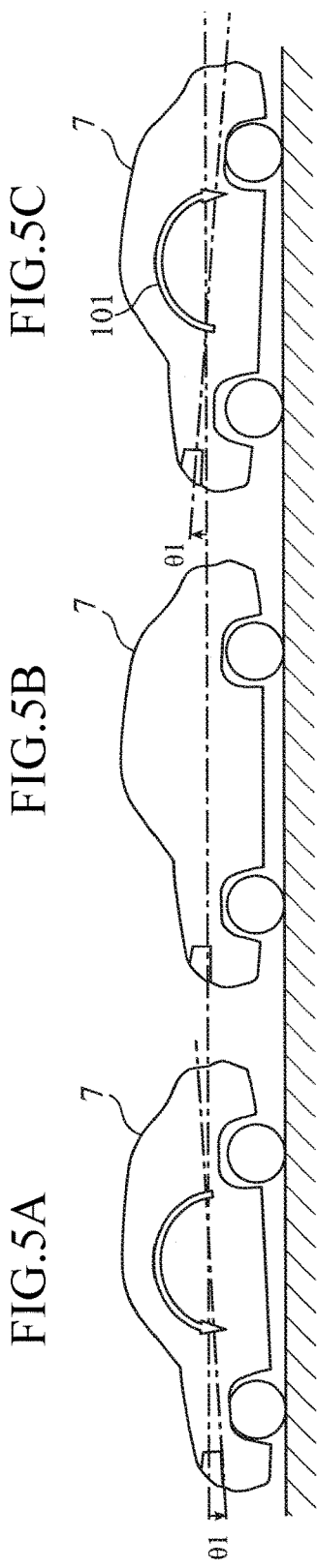

HEADLIGHT OPTICAL-AXIS CONTROL DEVICE

TECHNICAL FIELD

The present invention relates to a headlight optical-axis control device for controlling the optical axes of headlights using acceleration signals detected by an acceleration sensor.

BACKGROUND ART

As for the headlights mounted on a vehicle, to improve safety during night traveling as well as providing high designability and luxuriousness, instead of conventional halogen lamps, bright discharge lamps or LEDs (light emitting diodes) capable of illuminating an area in any desired direction have been widely used as light sources.

In order to mount the above bright light sources on a vehicle, when the rear of the vehicle is lowered, for example, because a passenger takes a rear seat or baggage is brought into the trunk, that is, when the illumination directions of the headlights tilt upward because the front of the vehicle is elevated, it is necessary to lower the illumination directions of the headlights, that is, necessary to lower the optical axes of the headlights so as to maintain the optical axes with respect to a road surface to prevent a driver of an oncoming vehicle from being dazzled and to prevent pedestrians facing the headlights from being made uncomfortable. In short, it is essential for the vehicle using the above bright light sources to have the headlight optical-axis control device for lowering the illumination directions of the headlights to thereby return it to an illumination direction that was used before its change, when the illumination directions of the headlights tilt upward owing to the tilt of the vehicle caused because a passenger gets on the vehicle or baggage is taken in the trunk.

In this regard, the passenger gets on the vehicle or baggage is taken in the trunk when the vehicle is stopped. The optical-axis control when the vehicle is stopped is the main control of the headlight optical-axis control device.

Since the optical-axis control of the headlights moves the optical axis up or down to compensate for the change of the tilt angle of the vehicle with respect to the road surface to thereby return the illumination direction of the headlights to the original direction where the vehicle tilts in the longitudinal direction as described above, it is first necessary to measure the tilt angle of the vehicle with respect to the road surface.

In a conventional system, using stroke sensors mounted on suspensions (suspension system) at both the front and rear of the vehicle, the shrinkages of the suspensions at the front and rear, that is, the lowering amounts of axles in the front and rear are measured, and, then, the tilt angle of the vehicle with respect to the road surface is calculated on the basis of the length of its wheelbase and the difference between the lowering amounts.

Recently, besides the configuration using the stroke sensors mounted on the above suspensions, a configuration using an acceleration sensor has been researched as disclosed in patent literature 1. In the configuration using the acceleration sensor, it is easy to detect a change in the tilt angle of the vehicle when the vehicle is stopped, and it is easy to obtain the tilt angle at the current moment by accumulating the changes relative to an initial tilt angle, caused when a passenger gets on and off the vehicle or in similar situations. On the other hand, the output of the acceleration sensor contains an offset and changes in the offset over time, and the tilt angle obtained by the accumulation includes a latent cumulative error. Thus, there is the problem that the accuracy of the tilt angle obtained by accumulating detection values and the changes is low. For this reason, to stably maintain the optical axes of the headlights at a proper angle over a long time, it is necessary to maintain the accuracy by applying some correction to accelerations detected by the acceleration sensor.

The above-described optical-axis control device of patent literature 1 improves the accuracy of the tilt angle of a vehicle with respect to a road surface by using a biaxial acceleration sensor for the longitudinal and perpendicular directions of the vehicle, and does not merely carry out an optical-axis control of the headlights when the vehicle is stopped, but also detects accelerations to carry out the optical-axis control of the headlights when the vehicle is traveling, to thereby carry out suitable optical-axis control of the headlights. The above-described optical-axis control device of patent literature 1 calculates the tilt angle of the vehicle with respect to the road surface by obtaining the changed direction of an acceleration for each time using the acceleration that is detected when the vehicle is traveling, or by obtaining the changed direction of the acceleration from two accelerations at different detection timings. The optical-axis control device controls the optical axis on the basis of the changes of the calculated tilt angle with respect to the road surface.

CITATION LIST

Patent Literature

Patent literature 1: Japanese Patent Application Publication No. 2012-106719.

SUMMARY OF INVENTION

Technical Problem

As for an vehicle in actual environment, its tilt varies in the direction in which the front of the vehicle is elevated or the rear of the vehicle is lowered by positive acceleration, or in which the front of the vehicle is lowered or the rear is elevated by deceleration (negative acceleration). For this reason, the change direction of the acceleration is not linear for the positive and negative accelerations.

However, in the above-described patent literature 1, under the assumption that the tilt angle of the vehicle with respect to the road surface does not change regardless of the positive acceleration or deceleration of the vehicle, the change direction of the acceleration for the positive acceleration or deceleration is calculated by linear approximation as shown in FIGS. 4 and 6 of patent literature 1. Namely, the tilt angle calculated by the method of the above-described patent literature 1 does not reflect tilt changed by the positive acceleration or deceleration of the vehicle, thus causing the problem that the accuracy is low.

The present invention is made in order to solve the above-mentioned problem, and it is therefore an object of the present invention to improve the accuracy of a tilt angle of a vehicle with respect to a road surface by considering into account the tilt changed by a positive acceleration or deceleration of the vehicle.

Solution to Problem

A headlight optical-axis control device in accordance with the present invention includes a controller configured to calculate a vehicle angle indicating a tilt angle of a vehicle relative to a road surface, using signals indicating accelerations in perpendicular and longitudinal directions which are detected by an acceleration sensor mounted on the vehicle, and configured to generate a signal for adjusting an optical axis of a headlight. The controller has information that is set in advance and indicates reference accelerations in the perpendicular and longitudinal directions. The controller is configured to: calculate vehicle angles based on ratios, each ratio being a ratio of a difference between the reference acceleration in the longitudinal direction and the signal indicating the acceleration in the longitudinal direction detected during traveling of the vehicle, to a difference between the reference acceleration in the perpendicular direction and the signal indicating the acceleration in the perpendicular direction detected during traveling of the vehicle by the acceleration sensor; calculate a plot of the calculated vehicle angles in a coordinate system that is set to have a first axis representing a difference between the reference acceleration and the signal indicating the acceleration in the longitudinal direction and a second axis representing a vehicle angle, thereby to derive a vehicle angle corresponding to a case where a change of the acceleration in the longitudinal direction is zero; and generate a signal for controlling the optical axis of the headlight on a basis of the derived vehicle angle.

Advantageous Effects of Invention

According to the present invention, using a plurality of signals indicating accelerations detected during traveling of a vehicle, its vehicle angle corresponding to the case where a change of the acceleration in the longitudinal direction is zero can be derived, namely, its vehicle angle when the vehicle is stopped or traveling at constant velocity can be derived. Therefore, even if the tilt of the vehicle changes owing to the positive acceleration or deceleration of the vehicle, the vehicle angle at high accuracy can be obtained. In addition, since the change of acceleration is used, an effect and change in the effect over time due to a latent offset contained in an output of the acceleration sensor can be reduced thereby to be able to stably obtain the vehicle angle over a long period of time.

Figure 3A:
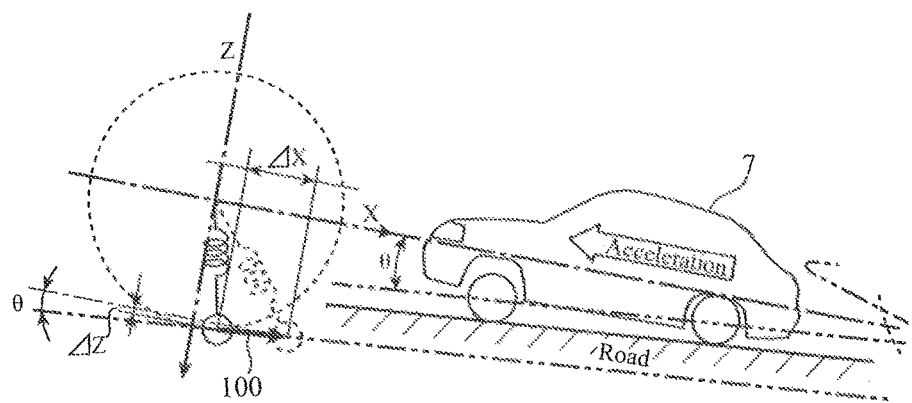
Figure 3B:
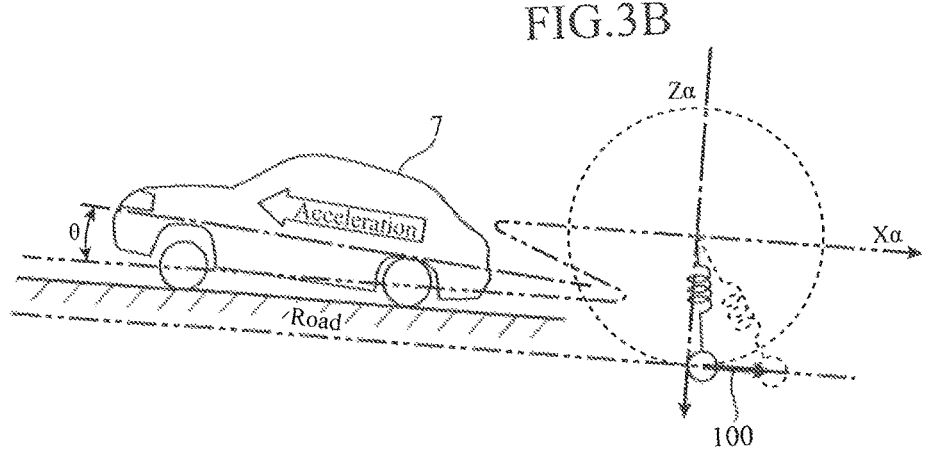
Figure 6:
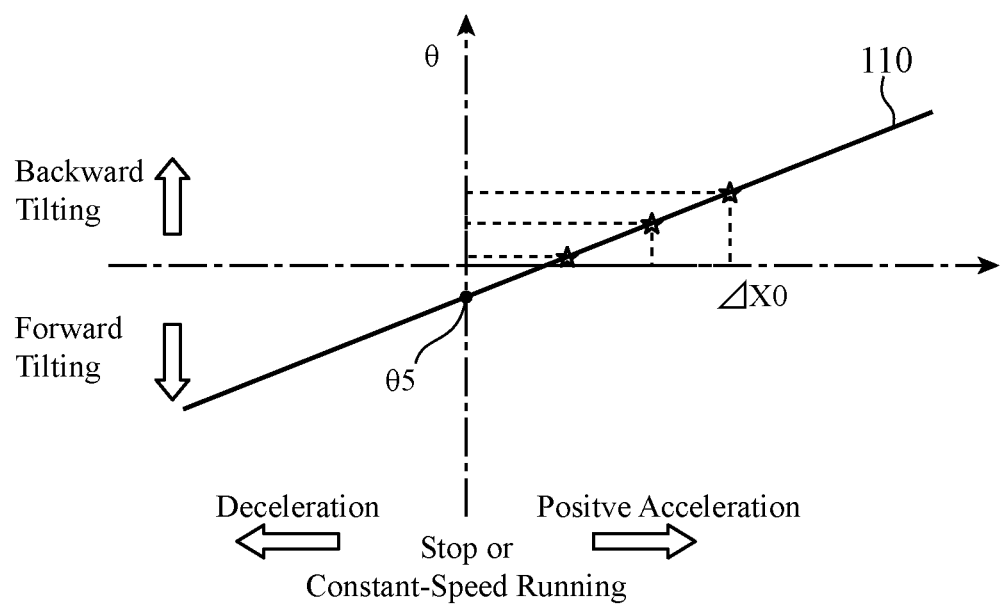
Figure 7:
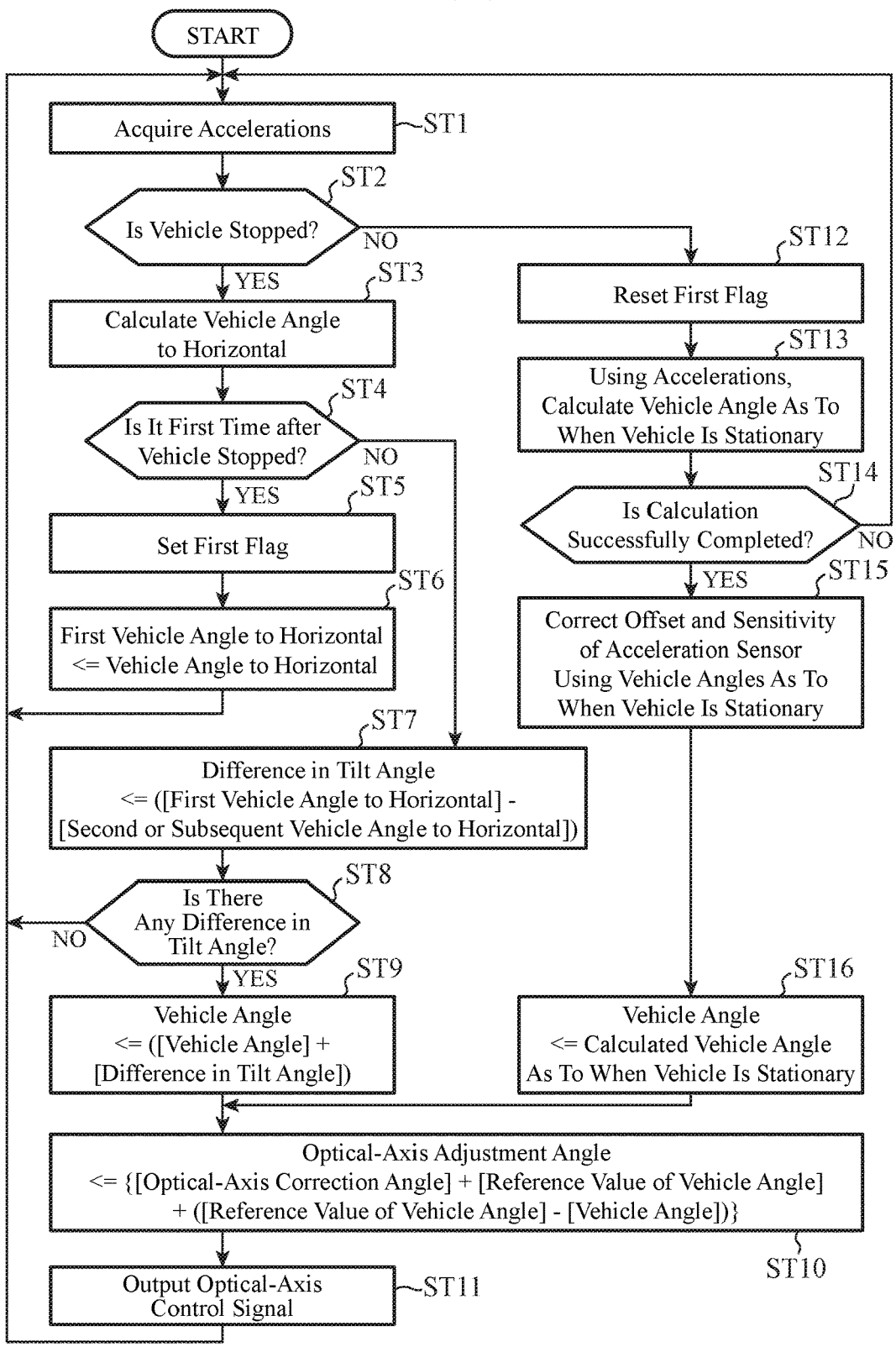
Figure 8:
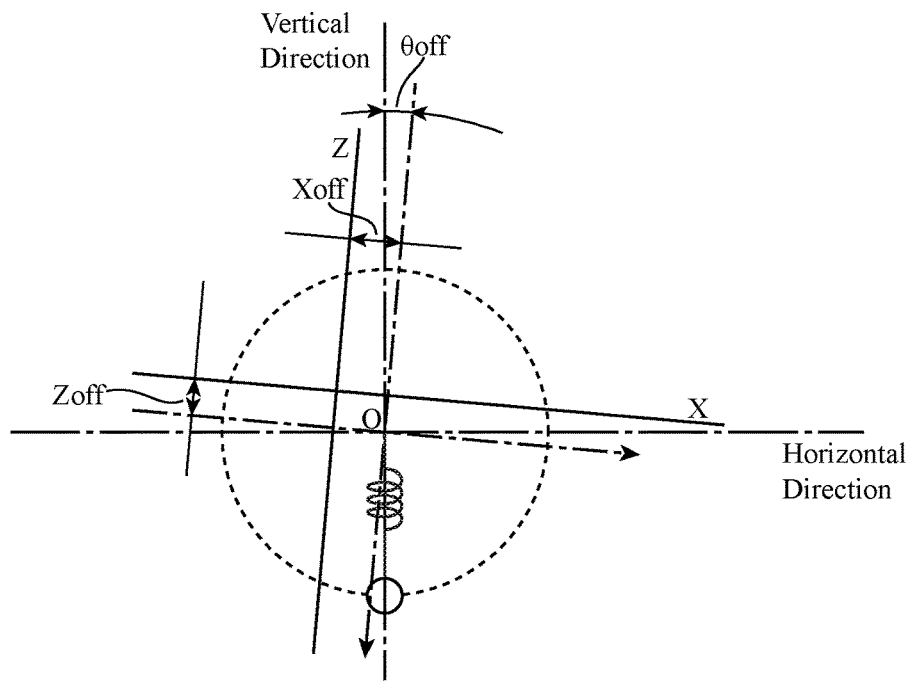
Figure 9:
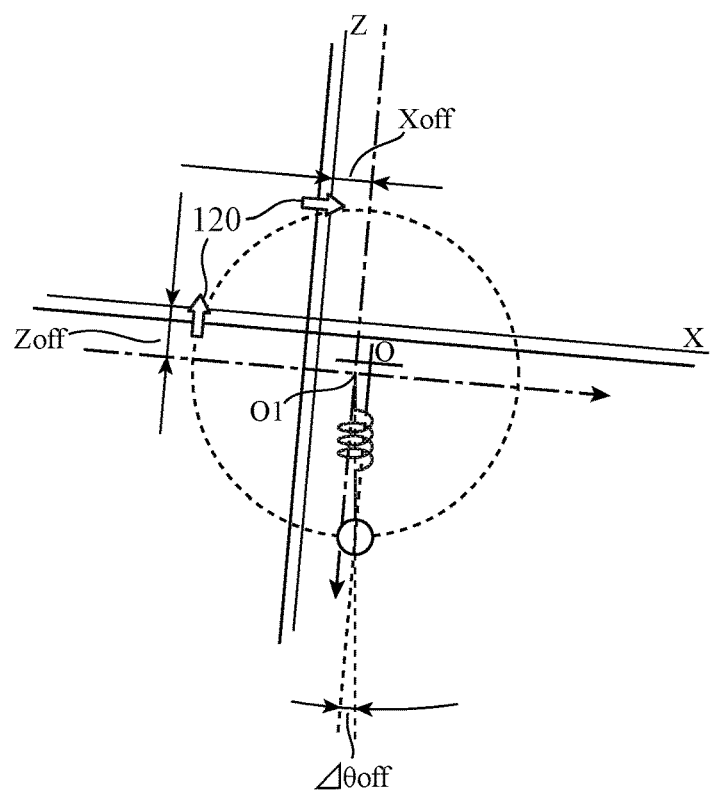
Figure 10:
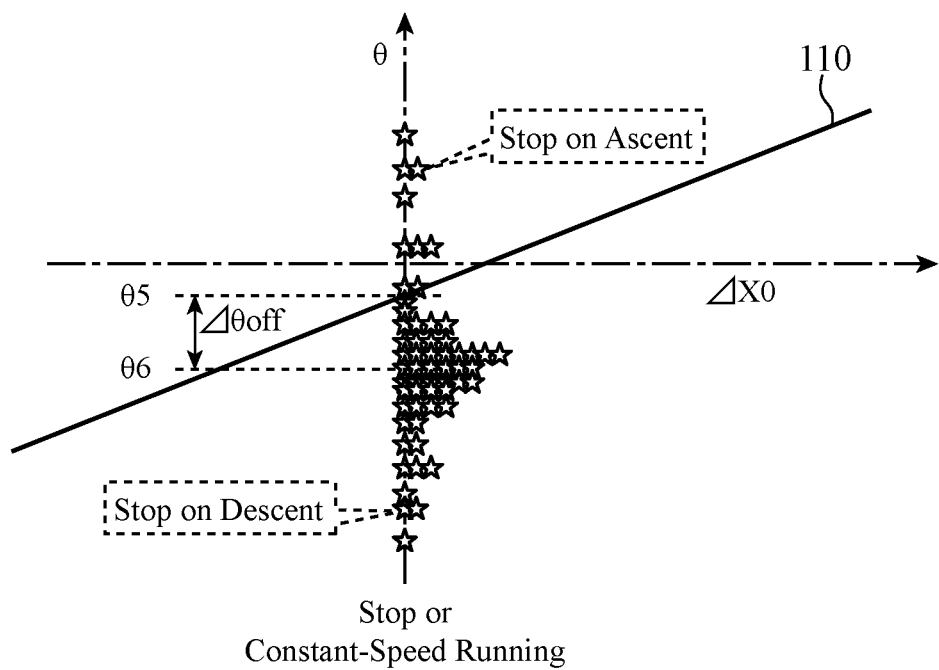
Figure 11:
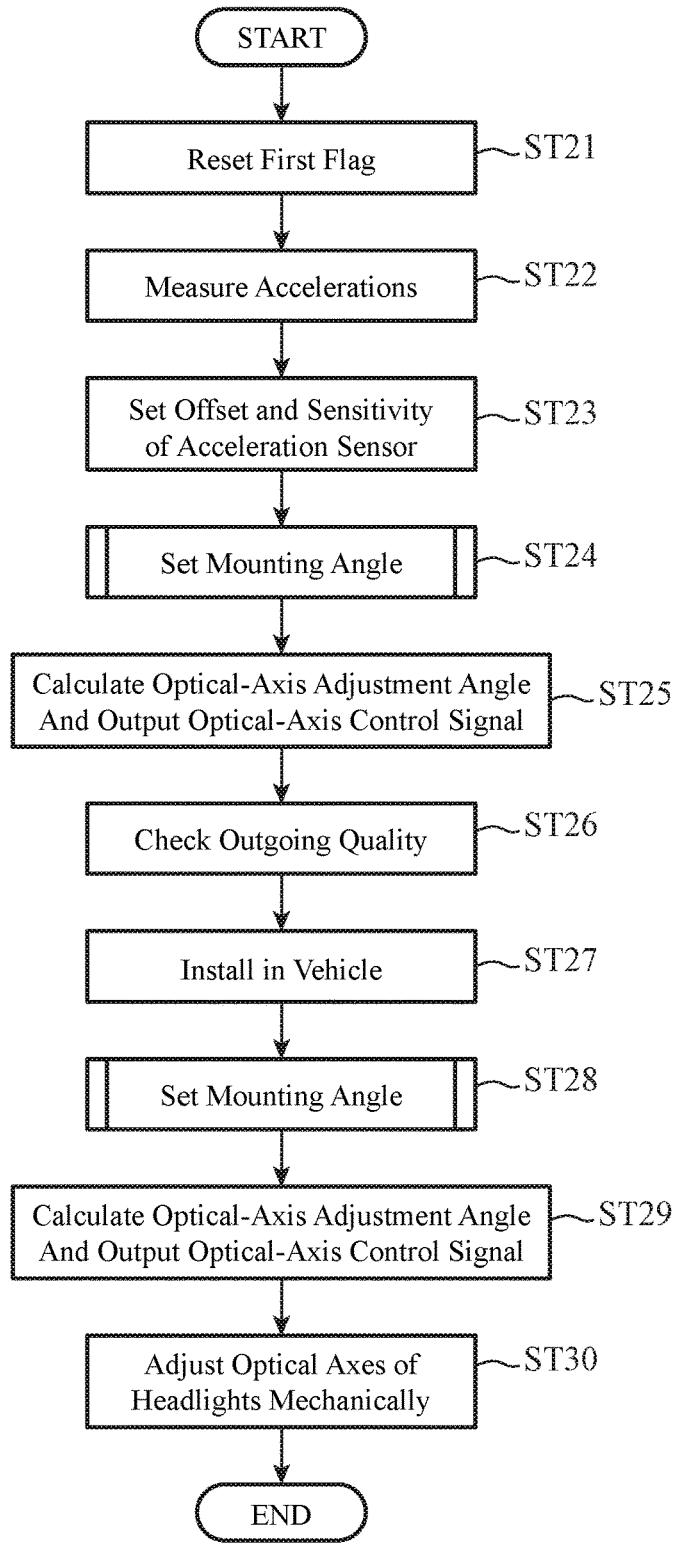
Figure 12B:
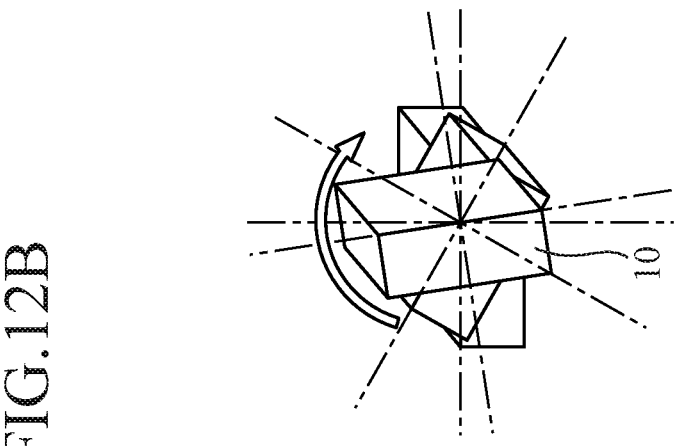
Figure 12A:
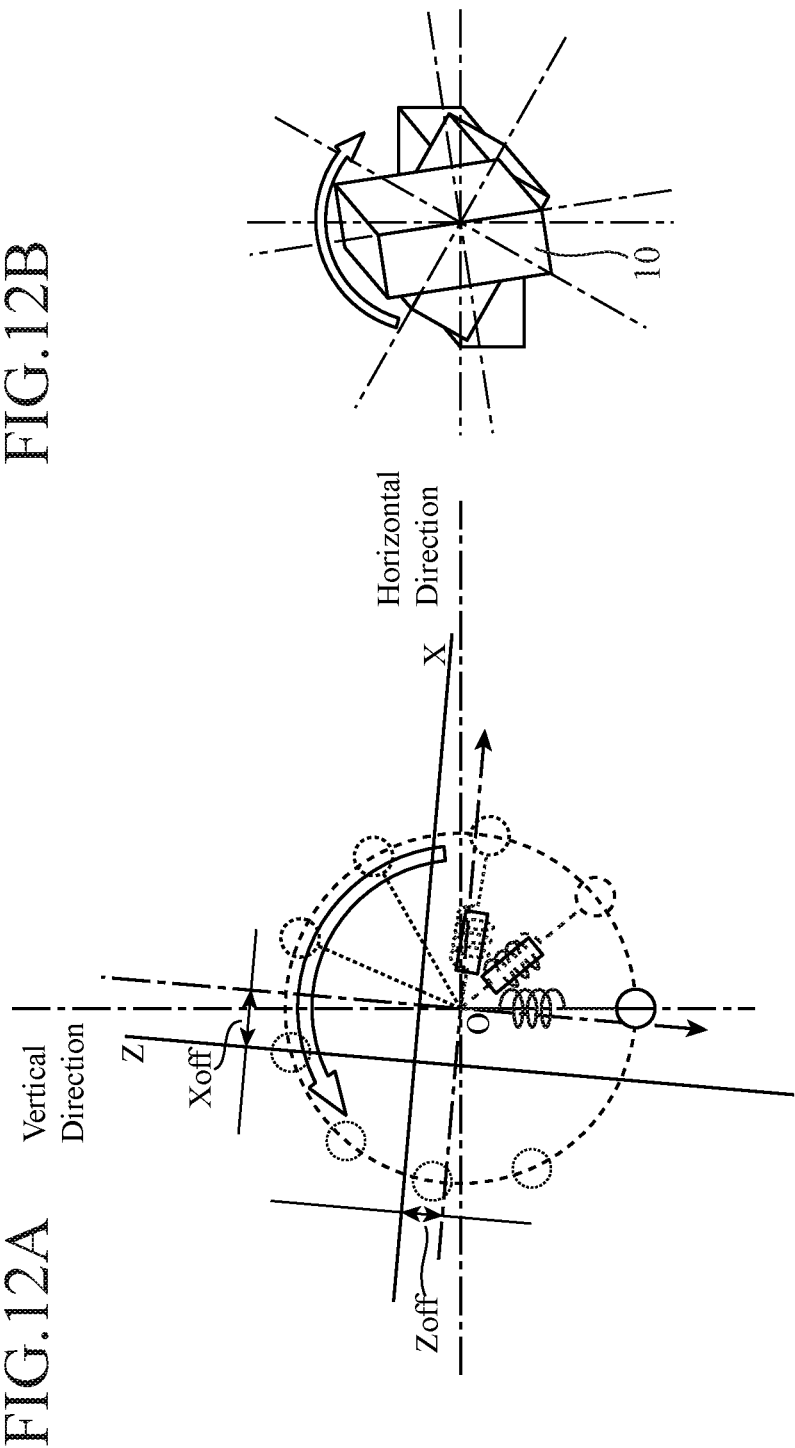
Figure 13:
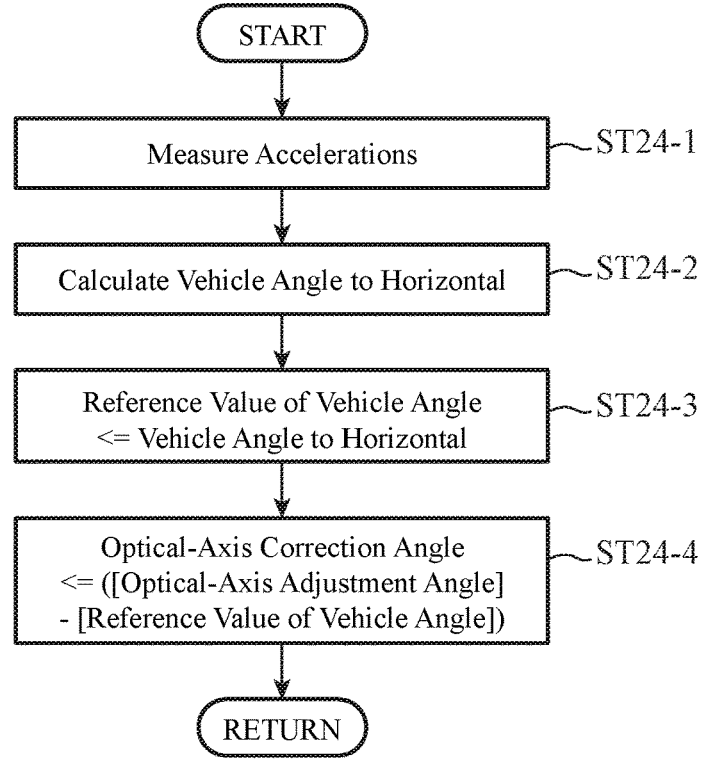
Figure 14:
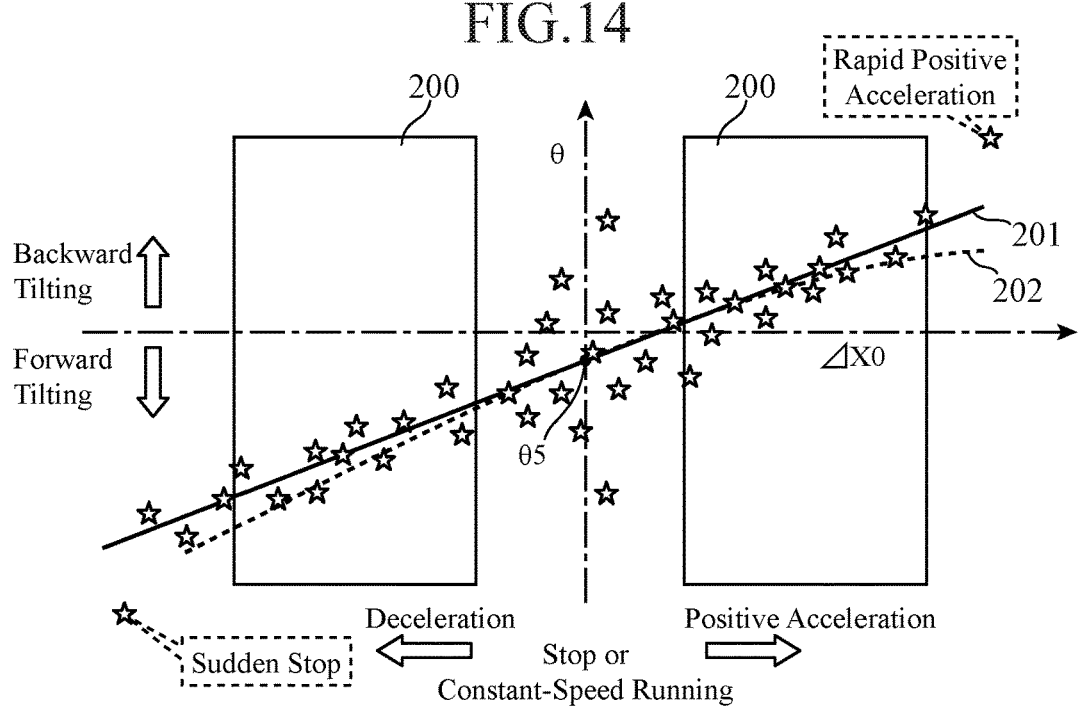
Figure 15:
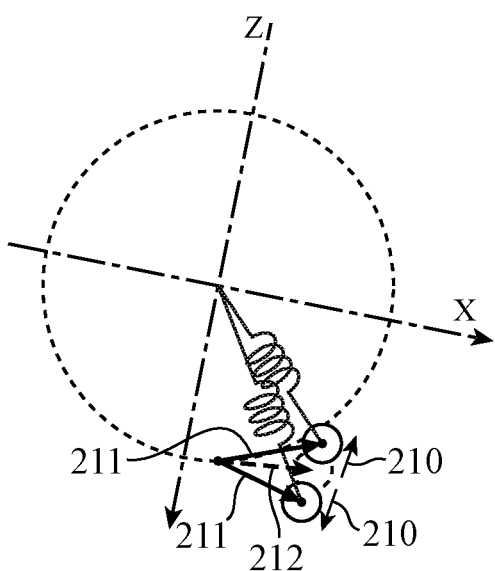

FIGs, 2A to 2C are diagrams showing exemplary installations of the headlight optical-axis control device of the first embodiment on a vehicle;

FIGS. 3A and 3B are diagrams illustrating relationships between an acceleration and vehicle angle in the first embodiment;

FIGS. 4A to 4D are diagrams illustrating relationships between an acceleration and a vehicle angle in the first embodiment, and illustrating a vehicle angle varying depending on the magnitude of the acceleration;

FIGS. 5A to 5C are diagrams illustrating the tilt of a vehicle that varies depending on the positive and negative accelerations in the first embodiment;

FIG. 6 is a graph showing relationships of the vehicle angles with respect to the change of acceleration in the X axis direction in the first embodiment;

FIG. 7 is a flowchart showing the operation of the headlight optical-axis control device of the first embodiment;

FIG. 8 is a diagram illustrating an offset latent in an acceleration sensor in the first embodiment;

FIG. 9 is a diagram illustrating a change with time of the offset latent in the acceleration sensor in the first embodiment;

FIG. 10 is a diagram illustrating an offset correction method of the headlight optical-axis control device of the first embodiment;

FIG. 11 is a flowchart showing a method of a default setting of the headlight optical-axis control device of the first embodiment;

FIGS. 12A and 12B are diagrams illustrating the method of the default setting of the headlight optical-axis control device of the first embodiment;

FIG. 13 is a flowchart showing a mounting angle setting method of the headlight optical-axis control device of the first embodiment;

FIG. 14 is a diagram illustrating a range used for calculating the vehicle angle by the headlight optical-axis control device in a third embodiment in accordance with the present invention; and FIG. 15 is a diagram illustrating a change of acceleration when a vehicle vibrates in the third embodiment.

DESCRIPTION OF EMBODIMENTS

Embodiments for carrying out the invention will now be described with reference to the accompanying drawings to explain the present invention in more detail.

First Embodiment

Figure 1:
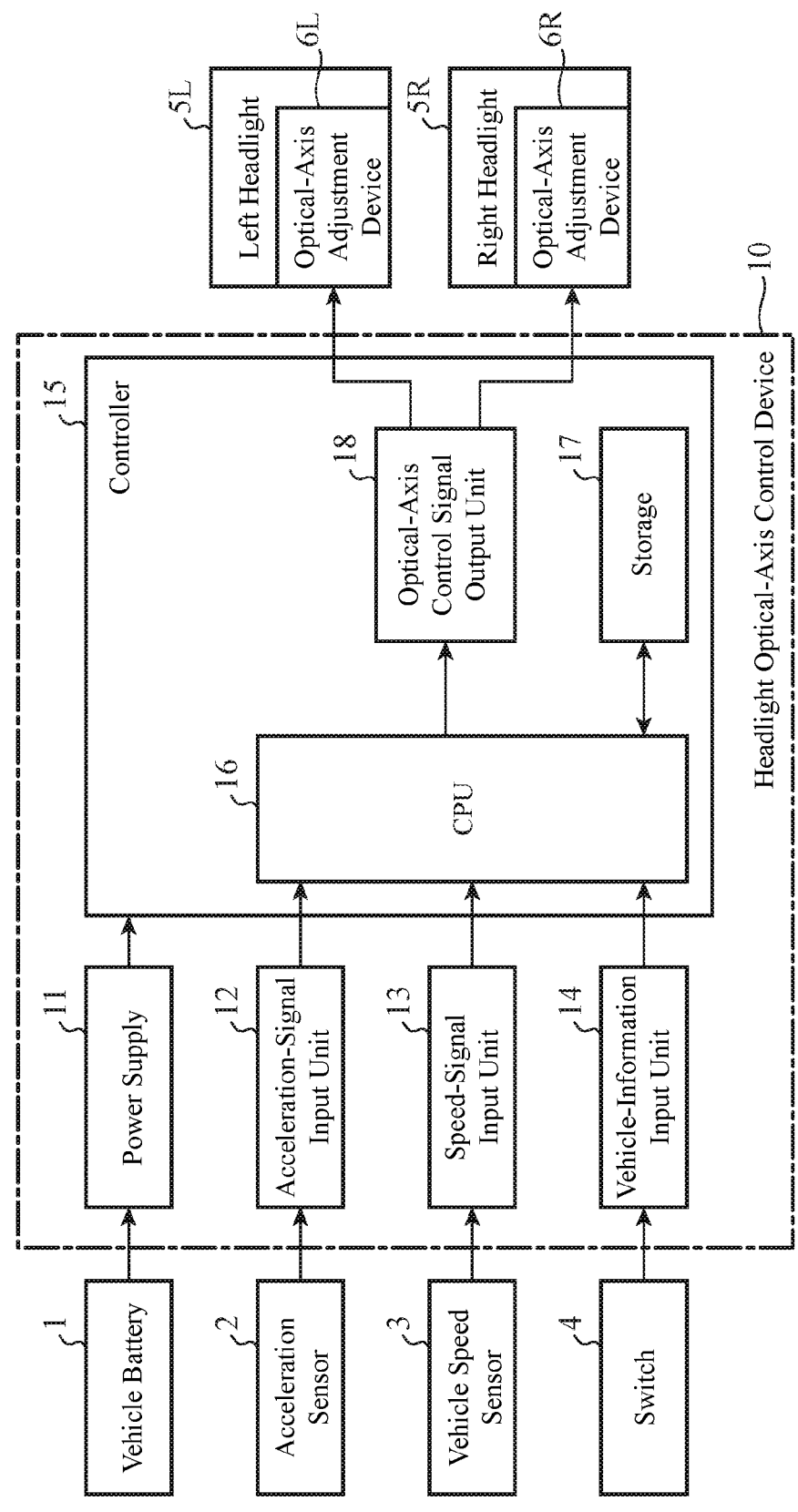
FIG. 1 is a block diagram showing a configuration of a headlight optical-axis control device of a first embodiment in accordance with the present invention.

FIG. 1 is a block diagram showing a configuration of a headlight optical-axis control device 10 of a first embodiment. The headlight optical-axis control device 10 of the first embodiment includes a power supply 11, an acceleration-signal input unit 12, a speed-signal input unit 13, a vehicle-information input unit 14, and a controller 15. The controller 15 includes a CPU (Central Processing Unit) 16, a storage 17 composed of a semiconductor memory or the like, and an optical-axis control signal output unit 18.

Figure 2A:
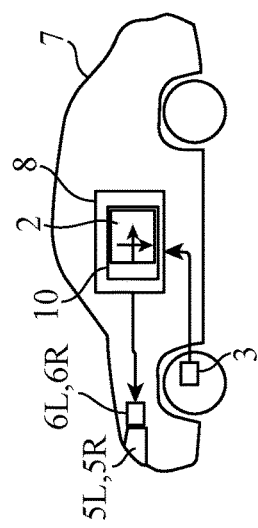
Figure 2B:
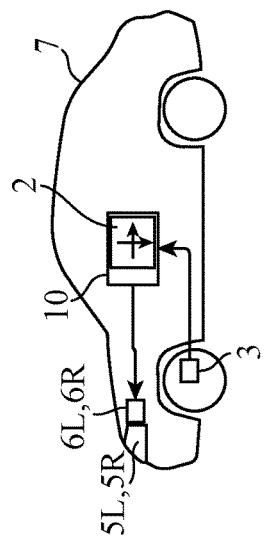
Figure 2C:
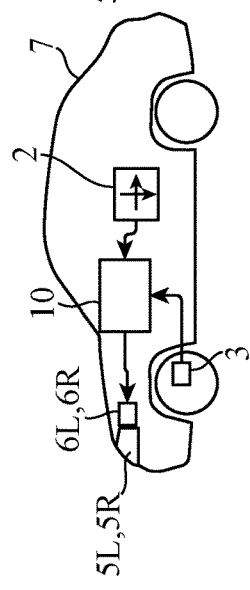

FIGS. 2A to 2C are diagrams showing exemplary installations of the headlight optical-axis control device 10 on a vehicle 7. The vehicle 7 includes: a left headlight 5L and a right headlight 5R which have optical-axis adjustment devices 6L and 6R for adjusting the direction of the optical-axis; an acceleration sensor 2; a vehicle speed sensor 3; and the headlight optical-axis control device 10. The acceleration sensor 2 detects the longitudinal and perpendicular accelerations, which are applied to the vehicle 7, and outputs acceleration signals. The vehicle speed sensor 3 detects the speed of the vehicle 7, and outputs a speed signal.

In the example of FIG. 2A, the headlight optical-axis control device 10 and the acceleration sensor 2 are configured separately. In the example of FIG. 2B, the headlight optical-axis control device 10 includes the acceleration sensor 2 to form a single unit. In the example of FIG. 2C, the headlight optical-axis control device 10 including the acceleration sensor 2 as its integral part is installed into onboard electrical equipment 8.

The headlight optical-axis control device 10 is a device for maintaining, in the vertical direction, the directions of the optical axes of the left and right headlights 5L and 5R that illuminate a region ahead of the vehicle 7.

The power supply 11 feeds the power of a vehicle battery 1 to the controller 15. The acceleration-signal input unit 12 supplies the CPU 16 with the longitudinal and perpendicular acceleration signals that are provided by the acceleration sensor 2. The speed-signal input unit 13 supplies the CPU 16 with a speed signal that is provided by the vehicle speed sensor 3. The vehicle-information input unit 14 supplies the CPU 16 with vehicle information indicating the contents of the driver's operation on a switch 4 of the vehicle 7, where the switch 4 is comprised of an ignition switch, lighting switch, dimmer switch or the like. The CPU 16 calculates a tilt angle of the vehicle 7 with respect to a road surface (hereinafter, referred to as the "vehicle angle") using the longitudinal and perpendicular acceleration signals and the speed signal, and generates an optical-axis control signal for compensating for the changes of the tilt angle. The optical-axis control signal output unit 18 feeds the optical-axis control signal calculated by the CPU 16, to the optical-axis adjustment devices 6L and 6R.

In response to the optical-axis control signal supplied from the headlight optical-axis control device 10, the optical-axis adjustment devices 6L and 6R perform the optical-axis control to adjust the angles of the optical axes of the headlights 5L and 5R, thereby compensating for the changes of the tilt angle of the vehicle 7. This makes it possible to maintain the optical axes at a fixed angle even if the tilt angle of the vehicle 7 changes.

FIGS. 3A to 3C and FIGS. 4A to 4D are diagrams illustrating relationships between a vehicle angle and accelerations.

In the following description according to the present invention, a measurement coordinate system for accelerations is used which is set to have a Z axis representing the perpendicular direction of the vehicle 7 and an X axis representing the longitudinal direction of the vehicle 7. As shown in FIG. 3A and FIGS 4A to 4D, the direction and magnitude of the acceleration that the vehicle 7 (the measurement coordinate system) undergoes are expressed by the position of a weight hanged on a spring.

Under the assumption that there is a virtual carriage that is a planar rectangle having four vertices which are positioned at the centers of four wheels placed on a road surface, the plane of the virtual carriage is parallel to the road surface, In considering the assumption into account, FIG. 3B illustrates variations of the acceleration that the vehicle 7 (the weight hanged on the spring) undergoes when seen from the virtual carriage of the vehicle 7 (that is, when seen from the road). In FIG. 3B, the perpendicular direction of the virtual carriage is represented by a Zα axis, and the longitudinal direction is represented by a Xα axis.

Figure 4A:
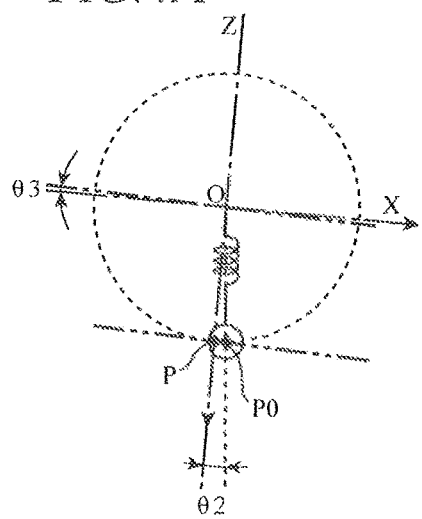
Figure 4B:
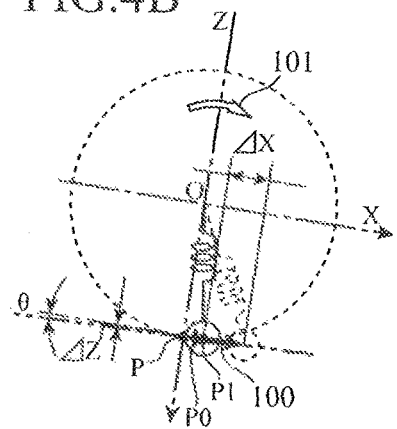
Figure 4C:
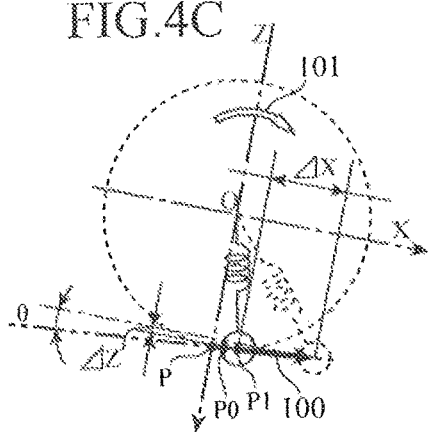
Figure 4D:
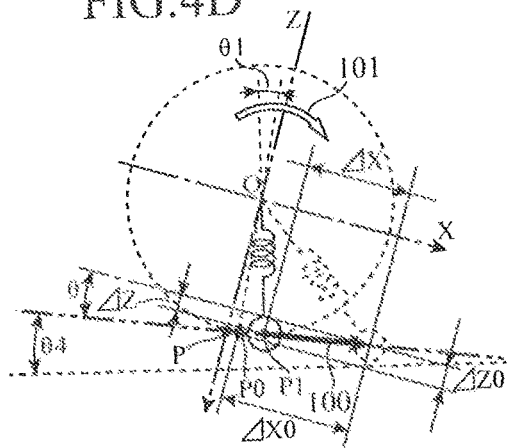

In addition, FIG. 4A illustrates a state where the vehicle is stopped and its acceleration is zero, and FIGS. 4B to 4D illustrate states where the vehicle is traveling and its acceleration increases in order as illustrated in FIGS. 4B, 4C and 4D. As the acceleration increases, the rotation of the vehicle 7 (as indicated by the arrow 101) also increases.

As shown in FIG. 3B, when the acceleration that the vehicle 7 (the weight hanged on the spring) undergoes is seen from the virtual carriage (that is, when seen from the road), in response to the acceleration of the vehicle 7, the weight moves in a direction parallel to the road surface on both a horizontal road and a sloping road. Thus, the change of the acceleration due to driving can be expressed by the arrow 100 parallel to the road surface.

On the other hand, as shown in FIG. 3A, when the acceleration that the vehicle 7 (the weight hanged on the spring) undergoes is seen from the measurement coordinate system, in response to the acceleration of the vehicle 7, the weight moves in a direction different from the X axis in the longitudinal direction of the measurement coordinate system of the vehicle 7 due to the acceleration of the vehicle 7. At this time, an angle θ is formed between the X axis in the longitudinal direction and the moving direction of the weight (the arrow 100) due to the acceleration of the vehicle 7, and is equal to the tilt angle of the vehicle 7 (measurement coordinate system) with respect to the road surface. The angle θ represents a vehicle angle.

Accordingly, in the measurement coordinate system for accelerations attached to the vehicle 7, the vehicle angle can be calculated independently of the slope of the road on which the vehicle is traveling, by observing the moving direction of the weight that moves in a direction parallel to the road surface, using the position of the predetermined position of the weight as a reference.

In other words, in the measurement coordinate system for accelerations attached to the vehicle 7, the vehicle angle can be calculated independently of the slope of the road on which the vehicle is traveling, by observing the change of accelerations in the Z and X axes in response to parallel moving to the road surface, using the predetermined accelerations in the Z and X axes as a reference, as given by the following Expression (1):

$$\theta = \tan^{-1}(\Delta Z/\Delta X) \tag{1}$$

Here, as shown in FIGS. 4A to 4D, the measurement origin of the measurement coordinate system for accelerations is denoted by the symbol O, the weight position is denoted by a measurement reference point P, and the accelerations in the directions of the X and Z axes with respect to the measurement origin O are denoted by X and Z. Assuming that the last position of the weight is a practical reference point P1, then the change ΔX of acceleration on the X axis is the difference between a longitudinal acceleration X detected by the acceleration sensor 2 and a longitudinal acceleration given by the practical reference point P1. The change ΔZ of acceleration on the Z axis is the difference between a perpendicular acceleration Z detected by the acceleration sensor 2 and a perpendicular acceleration given by the practical reference point P1.

FIG. 5C is a supplementary diagram to the foregoing FIGS. 4A to 4D. As shown in FIG. 5C, when the vehicle 7 actually accelerates, the vehicle 7 rotates in the direction indicated by the arrow 101 by a rotation angle θ1, and the vehicle 7 tilts in the direction in which its front is elevated and its rear is lowered. At the deceleration, the vehicle 7 tilts in the direction in which the front of the vehicle is lowered and its rear is elevated as shown in FIG. 5A. FIG. 5B shows a state in which the vehicle 7 is stopped or is traveling at a constant speed.

Thus, as shown in the above-described FIGS. 4B, 4C and 4D and FIGS. 5A to 5C, the vehicle angle θ includes the tilt (rotation angle θ1) indicating a change occurred by the positive acceleration or deceleration that the vehicle 7 undergoes.

For this reason, the accuracy of the vehicle angle θ obtained from a pair of the accelerations in the Z and X axes can be low. Therefore, it is not appropriated for the optical-axis control of the headlights to use the vehicle angle θ which is obtained from the pair of the accelerations in the Z and X axes, as it is.

To address this, in the first embodiment, a plurality of sets of accelerations in the Z and X axes detected during traveling is used to obtain an accurate vehicle angle even when the tilt of the vehicle 7 varies because of the positive acceleration or deceleration of the vehicle 7.

In the first embodiment, the vehicle angle θ is calculated by Expression (1A) as shown below.

In this regard, as shown in FIGS. 4A to 4D, the position of the weight at the time when the vehicle is stopped or traveling at a constant speed (that is, when the acceleration is zero) is chosen as a reference point P0, and the perpendicular acceleration Z0 and the longitudinal acceleration X0 as reference accelerations are used, which are applied to the vehicle 7 when the vehicle 7 is stopped. Assuming that the perpendicular acceleration detected by the acceleration sensor 2 when the vehicle 7 is traveling is denoted by Zn and the corresponding longitudinal acceleration is denoted by Xn, the vehicle angle θ is obtained by Expression (1A). This makes it possible to calculate the vehicle angle without being affected by the slope of the road on which the vehicle is traveling.

$$\theta = \tan^{-1}(\Delta Z0/\Delta X0) \quad (1A)$$

where $\Delta Z0 = Zn - Z0$, and $\Delta X0 = Xn - X0$.

In FIG. 4A, the position of the weight (reference point P0) as to when the vehicle is stopped or traveling at a constant speed corresponds to an angle θ2 that is the total of a tilt angle θ3 in the measurement axis (X axis) with respect to the road surface and a tilt angle θ4 of the road surface with respect to a horizontal plane.

For example, the CPU 16 decides whether the vehicle 7 is stopped or not on the basis of the speed signal of the vehicle speed sensor 3, and stores in the storage 17 the acceleration signals of the acceleration sensor 2 when it decides that the vehicle is stopped, as reference accelerations. In the optical-axis control, when the CPU 16 decides from the speed signal that the vehicle 7 is traveling, the CPU 16 calculates a vehicle angle θ from the acceleration signals provided newly from the acceleration sensor 2, using the accelerations stored in the storage 17 as references.

FIG. 6 is a graph showing the vehicle angle θ with respect to a change ΔX0 of acceleration in the X axis direction.

The CPU 16 calculates a plot of the vehicle angles θ which have been calculated using the accelerations in the Z and X axis directions detected by the acceleration sensor 2 when the vehicle is traveling, in the coordinate system that is set to have a first axis representing the change ΔX0 of acceleration in the X axis direction and a second axis representing the vehicle angles θ. FIG. 6 illustrates a plot of the vehicle angles θ as denoted by asterisks. The change ΔX0 of acceleration in the X axis direction is the difference between an acceleration signal Xn in the X axis direction detected by the acceleration sensor 2 and an acceleration X0 used as the reference.

The CPU 16 derives a representative line 110 or curve formed by the plot of vehicle angles θ. The CPU 16 sets the values at the position where the change ΔX0 of acceleration is zero on the derived line 110, as the vehicle angle θ5 as to when the vehicle 7 is stopped or traveling at a constant speed (hereinafter referred to as "the vehicle angle when the vehicle is stopped").

When the number of the calculated vehicle angles θ is two, the representative line 110 or curve can be a line or curve passing through their two points. When the number of the calculated vehicle angles θ is large, the representative line 110 or curve can be derived by an arithmetic method like a least squares method.

In this regard, one of the factors that may cause the typical characteristics of the vehicle angles θ for the acceleration to form a curved shape is that the springs used as suspensions of the vehicle 7 have nonlinear characteristics.

Since the calculation method shown in FIG. 6 calculates the vehicle angle θ5 when the vehicle is stopped by using the change of acceleration, there is no effect caused by an offset contained in the acceleration signals of the acceleration sensor 2. Thus, there is no problem even if the offset changes over time.

As for the offset of the acceleration sensor 2 and its change over time, they will be described later.

Next, an operation of the headlight optical-axis control device 10 will be described with reference to the flowchart of FIG. 7.

When the CPU 16 is turned on and starts its operation, the CPU 16 executes in accordance with the flowchart of FIG. 7.

The CPU 16 first acquires the perpendicular and longitudinal acceleration signals provided by the acceleration sensor 2 via the acceleration-signal input unit 12 (step ST1). Next, the CPU 16 decides, from the speed signal provided by the vehicle speed sensor 3 via the speed-signal input unit 13, whether the vehicle 7 is stopped or traveling (step ST2). In the exemplary operation of FIG. 7, the CPU 16 executes to switch between an optical-axis control performed when the vehicle 7 is stopped (steps ST3 to ST9) and an optical-axis control performed when the vehicle 7 is traveling (steps ST12 to ST16).

When the vehicle 7 is stopped ("YES" at step ST2), the CPU 16 calculates the tilt angle of the vehicle 7 with respect to the horizontal direction (vehicle angle to horizontal) using the acceleration signals obtained at step ST1 (step ST3). As for a calculation method of the vehicle angle to horizontal using the output of the acceleration sensor, since a known method can be used, its description will be omitted.

To decide whether the tilt of the vehicle 7 changes owing to getting on and/or off of a passenger or loading and unloading of a baggage when the vehicle is stopped, the CPU 16 has a first flag indicating whether the vehicle angle to horizontal that has been possibly obtained before the change has been stored in the storage 17 or not.

The CPU 16 checks whether the first flag has been set or not (step ST4), and if the first flag has not yet been set ("YES" at step ST4), the CPU 16 sets the first flag (step ST5), stores the vehicle angle to horizontal calculated at step ST3 in the storage 17 as the first vehicle angle to horizontal (step ST6), and returns the processing to step ST1.

When the first flag has been set ("NO" at step ST4), the CPU 16 reads out the first vehicle angle to horizontal from the storage 17, and subtracts the vehicle angle to horizontal calculated at step ST3 from the first vehicle angle to horizontal, thereby to calculate a difference in tile angle (step ST7). If there is any difference in tilt angle ("YES" at step ST8), the tilt of the vehicle 7 changes and hence the optical axis also changes owing to the getting on and/or off of a passenger, loading and unloading of baggage or in other similar situation. Then, the CPU 16 calculates the vehicle angle occurred after the change by adding the vehicle angle and the difference in tilt angle (step ST9). If there is no any difference in tilt angle ("NO" at step ST8), the tilt angle of the vehicle 7 does not change and the optical axis does not change. Then, the CPU 16 returns the procedure to step ST1.

Step ST10 is a procedure for obtaining the optical-axis adjustment angle for compensating for the changed angle to return the optical axis to its default position when the vehicle angle to horizontal of the vehicle 7 changes due to the getting on and/or off of a passenger, loading and unloading of a baggage or in other similar situation.

At step ST10, as for the (first) vehicle angle to horizontal obtained immediately after the vehicle 7 is stopped, the (second or later) vehicle angle to horizontal obtained thereafter changes, the CPU 16 calculate an optical-axis adjustment angle for compensating the change of the tilt angle and for returning the optical axis to its default position, and uses the calculated optical-axis adjustment angle for the optical-axis control. In this regard, the first vehicle angle to horizontal obtained immediately after the vehicle is stopped is an angle corresponding to the vehicle angle as to when the vehicle is traveling without the getting on and/or off of a passenger, loading and unloading of a baggage or in other similar situation, which is suitable to be used as a reference to observe the changes of the tilt angle when the vehicle is stopped.

With respect to the optical-axis control when the vehicle is stopped, for example, the vehicle 7 can be stopped on a horizontal road surface in advance, and the optical axis can be set to an angle of 1% in the angle of depression (to the angle that causes the optical axis to be lowered by 1 meter at 100 meters ahead). After the setting, in response to the difference indicating a change of the vehicle angle occurred when the vehicle is traveling without the getting on and/or off of a passenger, loading and unloading of a baggage or in other similar situation, the optical axes can be adjusted to compensate for the change of the vehicle angle so as to return the optical axes of the headlights 5L and 5R to the default position (by 1% in the angle of depression).

For example, the CPU 16 can calculate the optical-axis adjustment angle, using the optical-axis correction angle stored in advance in the storage 17, a reference value of the vehicle angle stored in advance in the storage 17, and the vehicle angle calculated at step ST8. The changes of the vehicle angle can be compensated for by the calculation "[reference value of a vehicle angle]−[vehicle angle]", and return the optical-axis to the default position by adding to it the calculation "[optical-axis correction angle]+[reference value of a vehicle angle]".

As for the optical-axis correction angle and the reference value of the vehicle angle, they will be described later.

The CPU 16 generates an optical-axis control signal from the optical-axis adjustment angle obtained at step ST10, and outputs the optical-axis control signal to the optical-axis adjustment devices 6L and 6R via the optical-axis control signal output unit 18 (step ST11). In response to the optical-axis control signal, the optical-axis adjustment devices 6L and 6R adjust the optical axes of the headlights 5L and 5R.

On the other hand, when the vehicle 7 is traveling ("NO" at step ST2), the CPU 16 resets the first flag (step ST12). Next, using the acceleration signal obtained when the vehicle 7 is traveling, at step ST1, the CPU 16 calculates vehicle angles θ according to the foregoing Expression (1A) and obtains the line 110 by calculating a plot of the vehicle angles θ in the coordinate system with the vehicle angle versus the change of acceleration as shown in FIG. 6. The CPU 16 uses the value on the line 110 corresponding to the case where the change of the longitudinal acceleration is zero, as a vehicle angle θ5 as to when the vehicle 7 is stationary (step ST13).

When the effective number of the vehicle angles θ for a plot is insufficient, and the CPU 16 cannot successfully calculate the vehicle angle 65 when the vehicle is stopped ("NO" at step ST14), the CPU 16 returns the procedure to step ST1.

On the other hand, when the vehicle angle 85 can be calculated when the vehicle is stopped ("YES" at step ST14), the CPU 16 proceeds to step ST15.

This step ST15 is a step for correcting the offset and sensitivity of the acceleration sensor 2, and the processing thereof will be described later.

After step ST15, the CPU 16 uses the vehicle angle as to when the vehicle is stationary, calculated at step ST13, as a vehicle angle (step ST16), further calculates an optical-axis adjustment angle at step ST10, generates an optical-axis control signal at step ST11, and outputs the optical-axis control signal to the optical-axis adjustment devices 6L and 6R via the optical-axis control signal output unit 18.

Thus, using the accelerations in the X and Z axis directions that the vehicle 7 undergoes when being moving, and calculating the vehicle angle when the change of acceleration in the X axis direction is zero, that is, when the vehicle is stopped or traveling at a constant speed, the CPU 16 can derive the vehicle angle when the vehicle is stopped without being affected by the slope of the road on which the vehicle is traveling or by the tilt of the vehicle 7 that can be changed by the positive acceleration or deceleration.

Next, a correction method of the offset and sensitivity of the acceleration sensor 2 at step ST15 will be described.

As described above, the output of the acceleration sensor 2 can include a latent offset, and can change over time. In addition, since the optical-axis control (steps ST3 to ST9), which uses the vehicle angles to horizontal as to when the vehicle 7 is stopped, employs a method of accumulating the changed angles for a long time, there is a possibility of accumulating errors. For this reason, the optical-axis control using the vehicle angles to horizontal has the possibility that the optical axis can deviate over time.

Here, the offset of the acceleration sensor 2 will be described using FIG. 8, and the change of the offset over time will be described using FIG. 9. FIG. 8 is a diagram illustrating a measurement coordinate system and a weight which are seen from the vertical and horizontal directions at the time of initialization of the acceleration sensor 2, in which the axis of ordinates corresponds to the vertical direction, the axis of abscissas corresponds to the horizontal direction. The intersection point of the X axis and Z axis is the origin of the acceleration sensor 2, and the intersection point of the vertical and horizontal directions is the measurement origin O when seen from the vehicle 7 (measurement coordinate system).

When the mounting angle of the acceleration sensor 2 with respect to the vehicle 7 is known, the offset Xoff in the X axis direction and the offset Zoff in the Z axis direction are given by the following Expressions (2) and (3).

$$Xoff = X - \{1 * \sin(\theta off)\} \quad (2)$$

$$Zoff = Z - \{1 * \cos(\theta off)\} \quad (3)$$

It is assumed here that θoff denotes a deviation (known) of the mounting angle with respect to the vertical direction, the gravitational acceleration is 1 G, and the acceleration signals detected by the acceleration sensor 2 is denoted by X and Z.

Over a long period of time, the mounting position and mounting angle of the acceleration sensor 2 gradually deviate with respect to the vehicle 7 (measurement coordinate system) because of the running vibration and the like of the vehicle 7 as indicated by the arrows 120 of FIG. 9. This will alter the offsets Xoff and Zoff, and also the vehicle angle to horizontal obtained from the acceleration signals when the vehicle is stopped. To correct the offset, it is necessary to increase or decrease Xoff and Zoff in such a manner as to make Δθoff zero, where Δθoff is the deviation of the vehicle angle due to the change of the offset.

The correction of the offsets Xoff and Zoff will correct the measurement origin O to O1 and the deviation of the vehicle angle to Δθoff=0.

In the first embodiment, to reduce the influence caused by the offset of the acceleration sensor 2 that varies over time, the CPU 16 corrects the offset at step ST15. At step ST15, the CPU 16 corrects the offsets of the acceleration signals of the acceleration sensor 2 by the following method in such a manner that the vehicle angle to horizontal when the vehicle is stopped becomes equal to the vehicle angle as to when the vehicle is stationary, obtained at step ST13.

FIG. 10 is a diagram illustrating the offset correction method at step ST15. The axis of ordinates of the graph indicates the vehicle angle θ, and the axis of abscissas indicates the change ΔX0 of acceleration in the X axis direction. Here, although the vehicle angles θ (shown by stars), which are calculated from the acceleration signals when the vehicle is stopped, will actually stand on the line of ΔX0=0, to represent the frequency of appearance in FIG. 10, the stars are illustrated in the form of a histogram that shows the number of the stars in the ΔX0 axis direction.

To check the tilt angle of the vehicle 7 with respect to the horizontal direction, although it is best to stop the vehicle 7 on a horizontal road surface and to use the acceleration signals obtained at the time, it is not substantial for a user to search for a horizontal road surface to handle the case. Thus, the CPU 16 collects a plurality of vehicle angles θ calculated from the acceleration signals when the vehicle 7 is stopped, calculates a plot of the vehicle angles θ as to when the vehicle is stopped, which are collected at step ST15, on a graph as shown in FIG. 10, and obtains the average or typical vehicle angle θ6 with a high frequency of appearance. The typical vehicle angle θ6 is used instead of the vehicle angle to horizontal.

As described above, since the vehicle angle θ5 when the vehicle is stopped, which the CPU 16 calculates from the acceleration signals when the vehicle is traveling, does not include the offset, the difference between the vehicle angle θ5 when the vehicle is stopped and the typical vehicle angle θ6 becomes the deviation Δθoff of the vehicle angle due to the change of the offset. The CPU 16 increases or decreases the offsets Xoff and Zoff in the foregoing Expressions (2) and (3) in such a manner as to satisfy Δθoff=0, that is, the vehicle angle to horizontal becomes equal to the vehicle angle θ6. The CPU 16 has stored the corrected offsets Xoff and Zoff in the storage 17, corrects the offsets of the acceleration signals supplied from the acceleration sensor 2 from that time on, and uses them for calculating the vehicle angle to horizontal.

It is to be noted that the correction timing of the offsets is not limited to that of step ST15.

Next, a method of a default setting of the headlight optical-axis control device 10 will be described using the flowchart of FIG. 11. Here, the configuration as shown in FIG. 2B or FIG. 2C as an example is used in which the acceleration sensor 2 is installed in the headlight optical-axis control device 10.

After the completion of the headlight optical-axis control device 10 in a factory, the first flag of the CPU 16 has been reset (step ST21). A worker tilts the headlight optical-axis control device 10 incorporating the acceleration sensor 2 in three or more directions so that the acceleration sensor 2 measures the perpendicular and longitudinal accelerations each time, and outputs the acceleration signals (step ST22). The CPU 16 estimates the offsets and sensitivity of the acceleration sensor 2 from the input acceleration signals (step ST23).

Here, FIG. 12A is a diagram illustrating the measurement coordinate system and the weight seen from the vertical direction and horizontal direction at the default setting, in which the axis of ordinates is the vertical direction and the axis of abscissas is the horizontal direction. As shown in FIG. 12B, when the headlight optical-axis control device 10 incorporating the acceleration sensor 2 is rotated, the center of a circle drawn by the acceleration (the weight hanged on the spring) detected with the acceleration sensor 2 indicates the offset, and the size of the circle indicates the sensitivity as shown in FIG. 12A.

Next, the worker fixes the headlight optical-axis control device 10 on a horizontal plane to carry out the mounting angle setting of the acceleration sensor 2 with respect to the headlight optical-axis control device 10 (step ST24). When the headlight optical-axis control device 10 receives a signal for setting from the outside, it stores the offsets and sensitivity of the acceleration sensor 2 estimated at step ST23 and the mounting angle setting value of step ST24 in the storage 17.

In this regard, as the signal for setting used for storing the foregoing various setting values, besides the signal for setting obtained through the communication with an external apparatus, a specific input pattern to the vehicle-information input unit 14 can be used instead, for example. In this connection, the specific input pattern is a cryptographic combination such as setting the select lever of the gearbox at "R", and lighting switch at "ON", followed by repeating "ON" of the passing switch three times or the like. It goes without saying that a combination of signals for the input pattern other than the above can also be used.

FIG. 13 shows a setting method of the mounting angle. In a state of being fixed on a horizontal plane, the acceleration sensor 2 measures the acceleration (step ST24-1), and the CPU 16 calculates a vehicle angle to horizontal (step ST24-2), and stores the calculated vehicle angle to horizontal in the storage 17 as the reference value of a vehicle angle (step ST24-3). Finally, the CPU 16 calculates the optical-axis correction angle by subtracting the reference value of a vehicle angle from the optical-axis adjustment angle (which is made zero at the time of setting the mounting angle), and stores it in the storage 17 (step ST24-4). At the time of setting the mounting angle, since the acceleration sensor 2 is fixed on the horizontal plane, the CPU 16 uses the median (=0 degrees) as the optical-axis adjustment angle the headlight optical-axis control device 10 outputs.

Changing the optical-axis correction angle=(the optical-axis adjustment angle at the time for setting the mounting angle minus the reference value of a vehicle angle) at step ST24-4 results in the optical-axis adjustment angle at the time of setting the mounting angle=(the optical-axis correction angle plus the reference value of a vehicle angle). The optical-axis correction angle and the reference value of a vehicle angle are stored in the storage 17 and are used in the flowchart of FIG. 7.

Next, the CPU 16 generates the optical-axis control signal from the optical-axis adjustment angle at the time of setting the mounting angle and outputs it (step ST25). The worker checks whether the optical-axis control signal takes a right value or not (step ST26).

The processing from step ST27 to ST30 is executed at a factory or maintenance workshop of the vehicle. A worker installs the headlight optical-axis control device 10 in the vehicle 7 (step ST27), and carries out the mounting angle setting of the acceleration sensor 2 to the vehicle 7 in a state where the vehicle 7 is stopped on a horizontal road surface (step ST28). The processing at steps ST28 and ST29 are the same as the processing at steps ST24 and ST25.

At step ST28, the mounting angle setting is performed in the same procedure as that of steps ST24-1 to ST24-4 in FIG. 13. A worker stops the vehicle 7 on a horizontal road surface, causes the headlight optical-axis control device 10 to recognize the vehicle angle to horizontal, that is, the deviation θoff of the mounting angle of the acceleration sensor 2 shown in FIG. 8, and to correct the mounting angle of the acceleration sensor 2 to the vehicle 7 (setting of the optical-axis correction angle at step ST24-4). The angle θoff is stored in the storage 17 to be used in the flowchart of FIG. 7.

After completing the electrical setting of the headlight optical-axis control device 10, a worker adjusts the optical axes of the headlights 5L and 5R mechanically with a wrench or driver to set the optical axes at the default position (for example, at 1% toward the depression angle side) (step ST30). Thus, when the optical-axis adjustment angle (=the optical-axis correction angle plus the reference value of a vehicle angle) is zero degrees, the optical axes of the headlights 5L and 5R are set to the default position corresponding to 1% in the angle of depression.

As described above, according to the first embodiment, the controller 15 of the headlight optical-axis control device 10 is configured to have the information that is set in advance and indicates reference accelerations in the perpendicular and longitudinal directions; to calculate the vehicle angles based on ratios, each ratio being a ratio of the difference between the reference acceleration in the longitudinal direction and the signal indicating the acceleration in the longitudinal direction detected when the vehicle 7 is traveling, to the difference between the reference acceleration in the perpendicular direction and the signal indicating the acceleration in the perpendicular direction detected by the acceleration sensor 2 when the vehicle is traveling; to derive a vehicle angle corresponding to the case where the change of the longitudinal acceleration is zero by calculating a plot of the calculated vehicle angles in the coordinate system set to have its first axis representing the difference in the longitudinal direction and its second axis representing the vehicle angles; and to generate the optical-axis control signal for adjusting the optical axes of the headlights 5L and 5R on the basis of the derived vehicle angle. Using a plurality of the signals indicating accelerations detected during traveling of the vehicle, its vehicle angle corresponding to the case where the change of the acceleration in the longitudinal direction is zero can be derived, namely, its vehicle angle when the vehicle is stopped or traveling at constant velocity can be derived. Therefore, even if the tilt of the vehicle 7 changes owing to the positive acceleration or deceleration of the vehicle 7, the vehicle angle at high accuracy can be obtained. In addition, since the change of acceleration is used, an effect and change in the effect over time due to a latent offset contained in an output of the acceleration sensor 2 can be reduced thereby to be able to stably obtain the vehicle angle over a long period of time.

In addition, according to the first embodiment, the controller 15 is configured to calculate the vehicle angle to horizontal using the perpendicular and longitudinal acceleration signals when the vehicle 7 is stopped which are detected with the acceleration sensor 2; derives the typical vehicle angle to horizontal from a plurality of vehicle angles to horizontal; and when the typical vehicle angle to horizontal differs from the vehicle angle corresponding to the case where the change of the longitudinal acceleration is zero, it corrects the acceleration signals detected with the acceleration sensor 2 in such a manner as to equalize the two vehicle angles. Accordingly, it can obtain the vehicle angle to horizontal at higher accuracy by correcting the latent offset of the acceleration sensor 2 and the change over time of the offset. As a result, it can implement the headlight optical-axis control device 10 capable of carrying out the stable optical-axis control of the headlights even when the vehicle is stopped.

In addition, according to the first embodiment, integrating the acceleration sensor 2 into the headlight optical-axis control device 10 as shown in FIG. 2B makes it possible to remove its wiring and the like, thereby being able to implement the headlight optical-axis control device 10 with a simple configuration.

In addition, according to the first embodiment, the headlight optical-axis control device 10 is integrated with the onboard electrical equipment 8 with a function different from the optical-axis control, into a single unit as shown in FIG. 2C. This makes it possible to simplify a system configuration to be mounted on the vehicle 7 because the headlight optical-axis control device 10 is not separately mounted.

Second Embodiment

Although the foregoing first embodiment uses, as the reference accelerations, the perpendicular acceleration Z0 and longitudinal acceleration X0 that the vehicle 7 undergoes, detected by the acceleration sensor 2 when the vehicle 7 is stopped, other accelerations can be used as references.

Since a headlight optical-axis control device of the second embodiment has the same configuration as that of FIG. 1 on the drawings, the headlight optical-axis control device will be described with reference to FIG. 1.

For example, the CPU 16 can use, as reference accelerations, a perpendicular acceleration Zs and longitudinal acceleration Xs that the vehicle 7 undergoes when the vehicle 7 is traveling at a constant acceleration.

Alternatively, for example, the CPU 16 can use, as reference accelerations, a perpendicular acceleration Zc and longitudinal acceleration Xc that the vehicle 7 undergoes when the vehicle 7 is traveling at a constant speed.

Further, for example, the CPU 16 can use, as reference accelerations, a perpendicular acceleration Z-100 and longitudinal acceleration X-100 which are detected by the acceleration sensor 2 a preset time before (100 ms before, for example).

Furthermore, a plurality of values as reference accelerations can be used for switching. The CPU 16 uses Z0 and X0 as reference accelerations during a period of time from the start of running (for example, a duration of five seconds at which a sudden acceleration at the start of running terminates). Thereafter, the CPU 16 can use Z-100 and X-100 as reference accelerations. The CPU 16 can switch from the reference accelerations to Zs and Xs when the vehicle 7 is traveling at a constant acceleration, and can switch from the reference accelerations to Zc and Xc when the vehicle 7 is traveling at a constant speed. Such a combination of reference accelerations can be used.

As shown in FIG. 4D, as for "the acceleration X" relative to the measurement origin O, the "change ΔX0 of acceleration" relative to the acceleration (reference point P0) when the vehicle is stopped or traveling at a constant speed, and the "practical change ΔX of acceleration" relative to the acceleration (reference point P1) immediately before (100 ms before, for example) when the vehicle is traveling, if any of them is used, the acceleration used as the reference comes on a circle the sensitivity of the acceleration sensor 2 draws, and the changes of the acceleration occurs in the tangential direction of the circle. For this reason, using any of them has little effect on the ratio (ΔZ0/ΔX0) to the "acceleration Z", "the change ΔZ0 of acceleration" and "the practical change ΔZ of acceleration", which are a variable quantity in the Z axis direction each.

Accordingly, the reference accelerations can be any of the pairs ΔX0 and ΔZ0, Xs and Zs, Xc and Zc, and X-100 and Z-100.

Third Embodiment

Although the foregoing first embodiment uses all the acceleration signals supplied from the acceleration sensor 2 to calculate the vehicle angle as to when the vehicle is stopped, the third embodiment is configured to use only the acceleration signals within a range that is set in advance.

Since a headlight optical-axis control device of the third embodiment has the same configuration as that of FIG. 1 on the drawings, the headlight optical-axis control device will be described with reference to FIG. 1.

FIG. 14 is a diagram illustrating a range 200 that is used by the headlight optical-axis control device 10 of the third embodiment for calculating the vehicle angle. In the graph, the axis of abscissas represents the change ΔX0 of acceleration in the X axis direction and the axis of ordinates represents the vehicle angles θ, where a plot of the vehicle angles θ, which are calculated from the acceleration signals detected when the vehicle is traveling, is denoted by asterisks.

FIG. 15 show the changes of the acceleration when the vehicle 7 vibrates. When the vehicle 7 vibrates because its wheel falls into a ditch or runs onto a stone, the acceleration signal which the acceleration sensor 2 outputs sometimes has acceleration 210 superimposed on an acceleration signal due to the vibration. If the acceleration 210 due to the vibration is superimposed, an acceleration signal with a value greater than a real acceleration or an acceleration signal with a value (possibly including a negative value) smaller than the real acceleration is output. As a result, the change 211 of acceleration as to when the vibration is present deviates from the change 212 of acceleration as to when no vibration is present.

In addition, when the vehicle 7 makes a sudden acceleration, sudden stop or the like and a great acceleration is detected, the vehicle 7 sometimes exhibits abnormal behavior. On the other hand, when the acceleration is small, there are some cases where the calculation result becomes abnormal because the denominator ΔX0 of the foregoing Expression (1A) for calculating the vehicle angle θ is small.

Accordingly, if a large or small acceleration signal beyond expectation is input, the CPU 16 does not use the vehicle angle θ calculated from the acceleration signal to calculate the vehicle angle θ5 when the vehicle is stopped.

For example, when the input acceleration signal is a range from −2 G to −0.5 G, or from 0.5 G to 2 G as indicated by the range 200 of FIG. 14, the CPU 16 calculates the representative line 201 or curve 202 from the vehicle angles θ, and derives the vehicle angle θ5 when the vehicle is stopped. On the other hand, the vehicle angles θ of the acceleration signals outside the range 200 are not used for the calculation.

In addition, the range 200 can be selected more strictly. For example, when the input acceleration signal is 1.1 times or more or 0.9 time or less than the last acceleration signal, the CPU 16 does not use the vehicle angle θ of the input acceleration signal for calculating the representative line 201 or curve 202.

In addition, although the range 200 is set for the longitudinal acceleration signal in the foregoing description, it can also be set for the perpendicular acceleration signal.

As described above, according to the third embodiment, the controller 15 is configured in such a manner that, when at least one of acceleration signals in the perpendicular and longitudinal directions detected by the acceleration sensor 2 is out of the range that is set in advance, the controller 15 does not use the acceleration signals for deriving the vehicle angle corresponding to the case where the change of the longitudinal acceleration is zero. Accordingly, abnormal acceleration signals can be excluded, thereby to be able to implement the headlight optical-axis control device 10 that is capable of controlling the optical axes of the headlights at high accuracy.

Fourth Embodiment

Although the foregoing third embodiment uses only the acceleration signal within the range that is set in advance for calculating the vehicle angle, the fourth embodiment is configured to decide whether to use the acceleration signal or not in accordance with the speed signal of the vehicle.

Since a headlight optical-axis control device of the fourth embodiment has the same configuration as that of FIG. 1 on the drawings, the headlight optical-axis control device will be described with reference to FIG. 1.

In FIG. 15, if there is no disturbance due to the vibration of the vehicle 7, the change of acceleration obtained by differentiating the speed signal of the vehicle speed sensor 3 is equal to the change 212 of acceleration obtained from the acceleration signals of the acceleration sensor 2.

Accordingly, if the change of acceleration obtained from the speed signal is equal to the change of acceleration obtained from the acceleration signals, the CPU 16 can decide that the acceleration 210 due to the vibration is not superimposed on the acceleration signal, thereby being able to confirm the accuracy of the acceleration signals of the acceleration sensor 2. In other words, if the changes of acceleration of the two are equal to each other, the CPU 16 can decide that using the acceleration signals of the acceleration sensor 2 does not cause any problem for calculating the vehicle angle as to when the vehicle is stopped.

The CPU 16 calculates not only the change of acceleration by differentiating the speed signal, but also the root of $(\Delta Z0^2 + \Delta X0^2)$ to obtain the change of acceleration of the acceleration signals corresponding to the change of acceleration obtained from the speed signal, and compares the two.

In this connection, the change of acceleration obtained from the speed signal and the change of acceleration obtained from the acceleration signals are considered to be equal when they are in a range from 0.9 to 1.1 times of each other, for example.

As described above, according to the fourth embodiment, the controller 15 is configured to convert the speed of the vehicle 7 into a change of acceleration, and configured to, when the differences between the change of acceleration obtained by the conversion and the change of the acceleration signals in the perpendicular and longitudinal directions detected by the acceleration sensor 2 are within the range that is set in advance, use the acceleration signals for deriving the vehicle angle corresponding to the case where the change of the longitudinal acceleration is zero. Accordingly, abnormal acceleration signals can be excluded thereby to implement the headlight optical-axis control device 10 capable of carrying out the optical-axis control of the headlights at high accuracy.

It is to be understood that, without departing from the scope of the invention, an arbitrary combination of two or more of the above-mentioned embodiments can be made, various changes can be made in an arbitrary component of any one of the above-mentioned embodiments, and an arbitrary component of any one of the above-mentioned embodiments can be omitted.

INDUSTRIAL APPLICABILITY

A headlight optical-axis control device in accordance with the present invention is configured to be capable of controlling the optical axis of a headlight at high accuracy even where an acceleration sensor is used, and therefore is suitable for an application to devices which control the optical axes of headlights using bright light sources such as LEDs.

REFERENCE SIGNS LIST

1: vehicle battery; 2: acceleration sensor; 3: vehicle speed sensor; 4: switch; 5L and 5R: headlights; 6L and 6R: optical-axis adjustment devices; 7: vehicle; 8: onboard electrical equipment; 10: headlight optical-axis control device; 11: power supply; 12: acceleration-signal input unit; 13: speed-signal input unit; 14: vehicle-information input unit; 15: controller; 16: CPU; 17: storage; and 18: optical-axis control signal output unit.

The invention claimed is:

1. A headlight optical-axis control device comprising a controller to calculate a vehicle angle indicating a tilt angle of a vehicle relative to a road surface, using accelerations in perpendicular and longitudinal directions which are detected by an acceleration sensor mounted on the vehicle, and to generate a signal for adjusting an optical axis of a headlight, the controller having information that is set in advance and indicates reference accelerations in the perpendicular and longitudinal directions, and the controller being configured to:

calculate vehicle angles based on ratios, each ratio being a ratio of a difference between the reference acceleration in the longitudinal direction and the acceleration in the longitudinal direction detected during traveling of the vehicle, to a difference between the reference acceleration in the perpendicular direction and the acceleration in the perpendicular direction detected during traveling of the vehicle by the acceleration sensor;

calculate a plot of the calculated vehicle angles in a coordinate system that is set to have a first axis representing a difference between the reference acceleration and the acceleration in the longitudinal direction and a second axis representing a vehicle angle, thereby to derive a vehicle angle corresponding to a case where a change of the acceleration in the longitudinal direction is zero; and generate a signal for controlling the optical axis of the headlight on a basis of the derived vehicle angle.

2. The headlight optical-axis control device according to claim 1, wherein the reference accelerations in the perpendicular and longitudinal directions are detected by the acceleration sensor which are:

accelerations in the perpendicular and longitudinal directions, obtained when the vehicle is stopped;

accelerations in the perpendicular and longitudinal directions, obtained when the vehicle travels at constant acceleration;

accelerations in the perpendicular and longitudinal directions, obtained when the vehicle travels at constant velocity; or accelerations in the perpendicular and longitudinal directions, obtained at a fixed time before which has been set in advance.

3. The headlight optical-axis control device according to claim 1, wherein, when an acceleration in at least one of the perpendicular and longitudinal directions, detected by the acceleration sensor, is out of a range that is set in advance, the controller does not use the detected acceleration for deriving the vehicle angle corresponding to the case where the change of the acceleration in the longitudinal direction is zero.

4. The headlight optical-axis control device according to claim 1, wherein the controller converts velocities of the vehicle into a change of an acceleration, and, when differences between the change of an acceleration obtained by the conversion and changes of the accelerations in the perpendicular and longitudinal directions detected by the acceleration sensor is within a range that is set in advance, the controller uses the detected accelerations for deriving the vehicle angle corresponding to the case where the change of the acceleration in the longitudinal direction is zero.

5. The headlight optical-axis control device according to claim 1, wherein the controller calculates vehicle angles to horizontal indicating tilt angles of the vehicle relative to a horizontal direction, using accelerations in the perpendicular and longitudinal directions detected by the acceleration sensor when the vehicle is stopped, derives a principal vehicle angle to horizontal from the vehicle angles to horizontal, and corrects the accelerations detected by the acceleration sensor to thereby cause the vehicle angle corresponding to the case where the change of the acceleration in the longitudinal direction is zero, to be equal to the principal vehicle angle to horizontal when the principal vehicle angle to horizontal is different from the vehicle angle corresponding to the case.

6. The headlight optical-axis control device according to claim 1, wherein the headlight optical-axis control device is integrated with the acceleration sensor into a single unit.

7. The headlight optical-axis control device according to claim 1, wherein the headlight optical-axis control device is integrated with onboard electrical equipment installed in the vehicle, into a single unit.

* * * * *